(12) United States Patent
Dikshit et al.

(10) Patent No.: US 12,432,092 B2
(45) Date of Patent: Sep. 30, 2025

(54) DYNAMIC ASSIGNMENTS OF TUNNELS TO BROADCAST GROUPS

(71) Applicant: HEWLETT PACKARD ENTERPRISE DEVELOPMENT LP, Spring, TX (US)

(72) Inventors: Saumya Dikshit, Bangalore (IN); Pradeep Kumar Surendran, Bangalore (IN); Madhavi Murthi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/417,698

(22) Filed: Jan. 19, 2024

(65) Prior Publication Data

US 2025/0119318 A1 Apr. 10, 2025

(30) Foreign Application Priority Data

Oct. 4, 2023 (IN) .............................. 202341066458

(51) Int. Cl.
*H04L 12/46* (2006.01)
*H04L 41/0893* (2022.01)

(52) U.S. Cl.
CPC ...... *H04L 12/4675* (2013.01); *H04L 12/4633* (2013.01); *H04L 41/0893* (2013.01)

(58) Field of Classification Search
CPC ............. H04L 12/4675; H04L 12/4633; H04L 41/0893
See application file for complete search history.

(56) References Cited

U.S. PATENT DOCUMENTS

| | | | |
|---|---|---|---|
| 10,530,656 | B2 | 1/2020 | Guo et al. |
| 2011/0107376 | A1* | 5/2011 | Lee ..................... H04N 21/4345 725/56 |
| 2015/0195137 | A1* | 7/2015 | Kashyap ............. H04L 41/0895 370/254 |
| 2020/0037035 | A1* | 1/2020 | Kaufman ............... H04L 65/612 |
| 2021/0044454 | A1* | 2/2021 | Xu ......................... H04L 49/351 |
| 2021/0194731 | A1* | 6/2021 | Gao ..................... H04L 12/4633 |
| 2022/0294665 | A1* | 9/2022 | Jameson ................. H04L 45/74 |
| 2024/0040472 | A1* | 2/2024 | Satyanarayana ...... H04W 40/28 |

OTHER PUBLICATIONS

Aruba, "Campus Shared border VTEP between EVPN Fabrics", AOS-CX 10.10 Update, 10 Update Jun. 2022, 31 pages.
Cisco, "Cisco Nexus 9000 Series NX-OS VXLAN Configuration Guide", Release 9.3(x), 2021, 560 pages.
Cisco, "Configuring Spine Switches in a BGP EVPN VXLAN Fabric", Jul. 2021, 58 pages.

(Continued)

*Primary Examiner* — Mohamed A. Wasel
(74) *Attorney, Agent, or Firm* — Hewlett Packard Enterprise Patent Department (57) ABSTRACT

In some examples, a system dynamically assigns, based on one or more factors, tunnels of an underlay and overlay network to a plurality of broadcast groups, where the one or more factors include a factor relating to an operation in the underlay and overlay network, and where the dynamic assignment of the tunnels to the plurality of broadcast groups includes modifying an assignment of a first tunnel from a first broadcast group to a second broadcast group of the plurality of broadcast groups.

20 Claims, 5 Drawing Sheets

(56) References Cited

OTHER PUBLICATIONS

Cisco, "VXLAN BGP EVPN based Multi-Site", Sep. 6, 2023, 121 Pages.
Juniper Networks, "EVPN User Guide", Jun. 15, 2023, 2373 pages.
Krattiger et al., "BESS Working Group, Multi-Site Solution for Ethernet VPN (EVPN) Overlay draft-sharma-bess-multi-site-evpn-03", Dec. 20, 2022, 22 pages.
Rabadan et al., "EVPN Multi-Homing Extensions for Split Horizon Filtering draft-nr-bess-evpn-mh-split-horizon-03", BESS Workgroup, Sep. 9, 2020, 15 pages.
Sajassi et al., "BGP MPLS-Based Ethernet VPN", Request for Comments: 7432, Feb. 2015, 56 pages.
Wikipedia, "VLAN", available online at <https://en.wikipedia.org/w/index.php?title=VLAN&oldid=1166683139>, Jul. 23, 2023, 7 pages.
Cisco Systems, Inc., "Configuring BGP EVPN Filtering," Cisco Nexus 9000 Series NX-OS VXLAN Configuration Guide, Release 9.3(x), Sep. 22, 2021, 25 pages.
Elmeleegy et al., "EtherProxy: Scaling Ethernet By Suppressing Broadcast Traffic", IEEE INFOCOM 2009, pp. 1584-1592.
Lukas Krattiger, "VXLAN BGP EVPN based Multi-Site", Cisco, Jan. 27-31, 2020, 121 pages.

\* cited by examiner

DYNAMIC ASSIGNMENTS OF TUNNELS TO BROADCAST GROUPS

BACKGROUND

A network environment can include an underlay and overlay network, in which an overlay network is provided over an underlying (underlay) network. In some examples, a Layer 2 network (e.g., an Ethernet network) can overlay a Layer 3 network (e.g., an Internet Protocol (IP) network).

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A Layer 2 overlay network is implemented by encapsulating Layer 2 frames as payloads in Layer 3 packets, such as according to the Virtual Extensible Local Area Network (VXLAN) protocol. The Layer 3 packets are communicated through a Layer 3 underlay network. Based on use of an underlay and overlay network (in which a Layer 2 network overlays a Layer 3 network), Layer 2 virtual networks such as virtual local area networks (VLANs) can span across the Layer 3 network, possibly across different physical domains (e.g., different data centers, different campuses, different geographic sites, and so forth). The spanning of a VLAN across different physical domains refers to stretching or extending the VLAN across the different physical domains.

An entity in a network device, such as a switch or another type of network device, that performs VXLAN encapsulation and decapsulation is referred to as a VXLAN tunnel endpoint (VTEP). The VTEP is part of the data plane of the underlay and overlay network used for forwarding of data by the network device. The network device also includes a control entity (that is part of the control plane of the underlay and overlay network) that exchanges control information with other network devices to enable forwarding of data by the network devices. In some examples, the control plane of the underlay and overlay network can operate according to the Ethernet Virtual Private Network (EVPN) technology.

A network environment may include multiple layers of network devices (e.g., multiple layers of switches). Network devices in a first layer may be connected to endpoint devices, such as computer servers, storage systems, communication nodes (e.g., wireless access points, base stations, etc.), and/or other devices for performing designated tasks. The network devices in the first layer may be connected to one or more network devices in a second layer. In some examples, the network devices in the first layer may be referred to as edge network devices (e.g., edge switches), and the network devices in the second layer may be referred to as border network devices. Edge network devices can include access network devices, leaf network devices, or any other network devices connected to endpoint devices. Border network devices can include aggregation network devices, core network devices, spine network devices, or any other network devices that connect edge or other border network devices to further networks.

The edge network devices in the first layer can include respective VTEPs. The VTEPs can be connected by VXLAN tunnels (or equivalently, VXLAN segments) to VTEP(s) in one or more border network devices of the second layer. In further examples, there may be more than two layers of network devices in network environments.

A host connected to a first VTEP (in an edge network device) may transmit a packet that may be forwarded to a broadcast group. A "host" can refer to a machine (e.g., an endpoint device), an electronic component in a machine, or a program executed in a machine. Such a packet is referred to as a "broadcast packet." The broadcast packet may be forwarded through the first VTEP (after VXLAN encapsulation) and over a first tunnel to a border network device. The border network device forwards the broadcast packet over respective further tunnels (which are part of the broadcast group) to VTEPs in other edge network devices. In some cases, a subset of VTEPs (one or more VTEPs in the edge network devices) may not be connected to any hosts, or alternatively, the subset of VTEPs may be connected to hosts that are not involved in a workflow that the broadcast packet is associated with. As a result, forwarding the broadcast packet to the subset of VTEPs results in wasted use of network resources associated with the subset of VTEPs. In a network environment with many edge network devices and many VTEPs, broadcast packets may flood the network environment and overburden network resources, which may reduce network performance relating to communications of data traffic and may lead to network outages.

In accordance with some implementations of the present disclosure, a broadcast broker manages the dynamic assignment of tunnels to broadcast groups. A tunnel refers to a network segment of an overlay network that connects an edge network device to a border network device. A tunnel is tied to the overlay network and is built on top of the underlay network. Tunnels can include an intra-fabric tunnel, which is a tunnel between VTEPs in the same fabric. Tunnels can also include an inter-fabric tunnel, which is a tunnel between VTEPs across fabrics. A discussion of fabrics is provided further below.

A "broadcast group" refers to a grouping (or domain) of entities that are to receive a packet targeted to the broadcast group. In accordance with some examples of the present disclosure, the broadcast groups include a "deny" broadcast group (DBG) and one or more "assigned" broadcast groups (ABGs). A network device (e.g., a border network device)

does not forward broadcast packets to any tunnel that is assigned to the DBG. On the other hand, a network device (e.g., a border network device) forwards a broadcast packet to a tunnel that is assigned to an ABG, provided that the broadcast packet is targeted to the ABG. The dynamic assignment of tunnels to broadcast groups performed by the broadcast broker can be based one or more factors (example factors are discussed further below). The broadcast broker can be part of a border network device, or can be part of a computer system separate from the border network device.

In some examples, a packet may be forwarded to a broadcast group if the packet is part of broadcast, unknown unicast, or multicast (BUM) traffic. BUM traffic refers to any or some combination of: (1) data traffic that is sent to a broadcast address, (2) data traffic that has a unicast address for which a network device does not have information (e.g., the forwarding table of the network device is not populated with the unicast address so the network device does not know how to forward the data traffic), or (3) data traffic that is sent to a multicast address. As used here, "data traffic" (or more simply "traffic") can include one or more packets.

Examples of discussions of EVPN are discussed in Request for Comments (RFC) 7209, "Requirements for Ethernet VPN (EVPN)," dated May 2014; RFC 7432, "BGP MPLS-Based Ethernet VPN," dated February 2015; RFC 8365, "A Network Virtualization Overlay Solution Using Ethernet VPN (EVPN)," dated March 2018; and RFC 8317, "Ethernet-Tree (E-Tree) Support in Ethernet VPN (EVPN) and Provider Backbone Bridging EVPN (PBB-EVPN)," dated January 2018. VXLAN is discussed in RFC 7348, entitled "Virtual extensible Local Area Network (VXLAN): A Framework for Overlaying Virtualized Layer 2 Networks over Layer 3 Networks," dated August 2014.

Although reference is made to example technologies in the present discussion, it is noted that in other examples, techniques or mechanisms according to some implementations of the present disclosure are applicable to different technologies, including different versions of EVPN and/or VXLAN, or other technologies, whether standardized, open-source, or proprietary.

Figure 1:
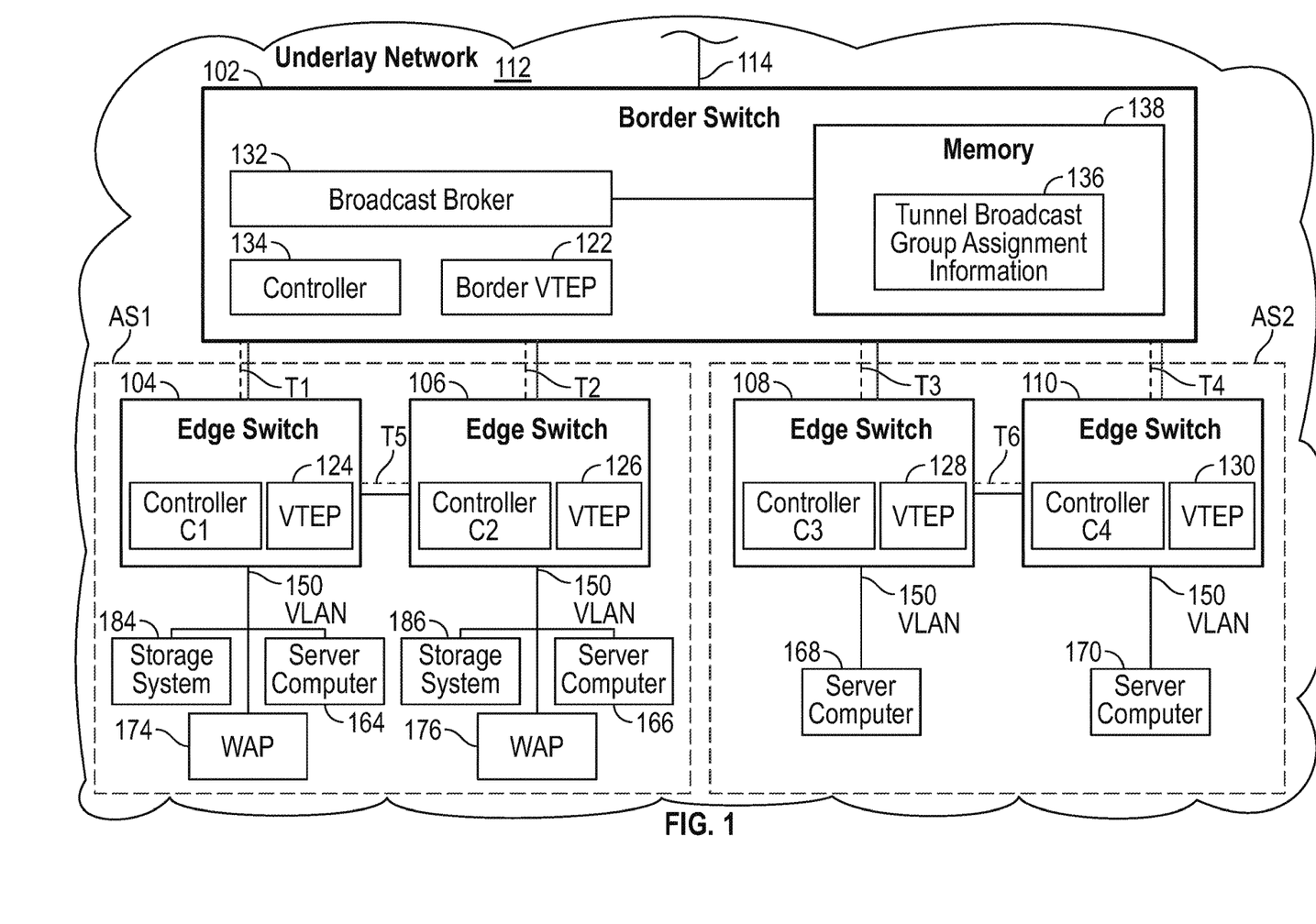
FIG. 1 is a block diagram of an arrangement of switches for an underlay and overlay network, according to some examples.

FIG. 1 is a block diagram of an example arrangement that includes a border switch 102 connected to edge switches 104, 106, 108, and 110. Although a specific quantity of edge switches are depicted in FIG. 1, in other examples, a different quantity of edge switches may be connected to the border switch 102. Additionally, in further examples, there may be more than one border switch in a network arrangement. As further shown in FIG. 1, the border switch 102 can be connected over a further network 114, such as a wide area network (WAN), to another entity.

Although FIG. 1 shows two layers of switches (a first layer including the edge switches 104, 106, 108, and 110, and a second layer including the border switch 102), in other examples, there may be additional layer(s) of switches. Packets can traverse through multiple layers of switches. More generally, packets can traverse through multiple layers of network devices when communicating packets between a source endpoint device and one or more destination endpoint devices.

The border switch 102 and the edge switches 104, 106, 108, and 110 are examples of network devices in a network arrangement. A switch is able to forward data packets based on Layer 2 network addresses, such as Media Access Control (MAC) addresses, in the data packets. More generally, a "network device" refers to any device in a network that is able to forward data packets along network paths, based on forwarding information in the data packets, where the forwarding information can include network addresses (e.g., Layer 2 network addresses, Layer 3 network addresses such as IP addresses), labels such as Multiprotocol Label Switching (MPLS) labels, or other forwarding information.

A "data packet" (or more simply, a "packet") refers to a unit of data. The packet can include a payload to carry data, which can include user data, program data, control information, or other types of data. The packet can also include a header that includes control fields, such as network address field(s), protocol field(s) to identify a protocol used, and other fields or parameters.

Examples of edge switches include access switches, leaf switches, or any other switches that connect to endpoint devices. An "endpoint device" refers to an electronic device that is able to communicate over a network. A "border switch" can refer to a core switch, an aggregation switch, or any other type of switch that is able to connect another switch to a different entity, where the different entity can be a switch, a network, or another entity.

The network arrangement of FIG. 1 includes an underlay and overlay network, in which an overlay network (an L2 network) is provided over an underlay network 112, which is an L3 network such as an IP network. The overlay network includes a control plane (e.g., that operates according to the EVPN technology) and a data plane that includes tunnels (e.g., VXLAN tunnels).

The control plane is implemented using controllers in respective switches, including a controller 134 in the border switch 102, and controllers C1, C2, C3, and C4 in respective edge switches 104, 106, 108, and 110. The controllers 134, C1, C2, C3, and C4 can operate according to EVPN in some examples. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The control plane performs control functionalities that support the forwarding of packets of the overlay network. For example, the control plane can perform network address learning (e.g., MAC address learning), which refers to a process of obtaining MAC addresses of devices that communicate over a network. As MAC addresses are learned, the MAC addresses are added to forwarding tables in switches that are used for forwarding packets. A forwarding table is also referred to as a forwarding information base (FIB).

EVPN is a standards-based technology that provides virtual multipoint bridged connectivity between different Layer 2 domains over a Layer 3 underlay network. EVPN is an extension to the Border Gateway Protocol (BGP) that allows the network to carry endpoint reachability information such as Layer 2 MAC addresses and Layer 3 IP addresses. According to EVPN, the Layer 2 overlay network (referred to as an EVPN-VXLAN overlay network) overlays an IP network. The controllers 134, C1, C2, C3, and C4 that operate according to EVPN can exchange reachability information so that VTEPs can interact with one another.

In the example of FIG. 1, a tunnel T1 is established between the edge switch 104 and the border switch 102, a tunnel T2 is established between the edge switch 106 and the border switch 102, a tunnel T3 is established between the edge switch 108 and the border switch 102, and a tunnel T4 is established between the edge switch 110 and the border switch 102. Note that it is possible for multiple tunnels to be established between a given pair of switches.

As further depicted in FIG. 1, a tunnel T5 is established between the edge switch 104 and the edge switch 106, and a tunnel T6) is established between the edge switch 108 and the edge switch 110. The tunnels T1 to T6 can be VXLAN tunnels in some examples. The tunnels T1 to T6 are part of the overlay network.

In other examples, other types of tunnels according to other technologies (e.g., different from EVPN and VXLAN) for an overlay network can be employed.

In examples shown in FIG. 1, the tunnel T1 is established between a VTEP 124 in the edge switch 104 and a border VTEP 122 in the border switch 102; the tunnel T2 is established between the VTEP 126 in the edge switch 106 and the border VTEP 122; the tunnel T3 is established between a VTEP 128 in the edge switch 108 and the border VTEP 122; and the tunnel T4 is established between a VTEP 130 in the edge switch 110 and the border VTEP 122. The tunnel T5 is established between the VTEP 124 in the edge switch 104 and the VTEP 126 in the edge switch 106; and the tunnel T6 is established between the VTEP 128 in the edge switch 108 and the VTEP 130 in the edge switch 110.

The VTEPs 122, 124, 126, 128, and 130 are part of the data plane of the overlay network. A VTEP can be implemented using one or more hardware processing circuits or a combination of the one or more hardware processing circuits and machine-readable instructions. For example, the VTEP can be implemented using an application specific integrated circuit (ASIC) device, or any other type of hardware processing circuitry.

As noted above, a VTEP can perform VXLAN encapsulation and decapsulation. VXLAN encapsulation encapsulates a Layer 2 packet by adding a VXLAN header. The VXLAN encapsulation produces an encapsulated packet that includes the VXLAN header and a payload including the encapsulated Layer 2 packet. The VXLAN header includes a virtual network identifier (VNI) that identifies a Layer 2 segment. The VNI is mapped to a VLAN; in other words, given a specific VNI, a VTEP can identify the corresponding VLAN, such as based on mapping information that correlates VNIs to VLANs (or more specifically, identifiers of VLANs). The combination of a VNI and an address (e.g., an IP address) of a VTEP (e.g., a VTEP in an edge switch) may uniquely identify a tunnel between the edge switch and the border switch 102. Note that there may be multiple VNIs used between a pair of VTEPs, e.g., the multiple VNIs identify respective VLANs. To uniquely identify a tunnel, a combination of a VNI and an address of a VTEP is used.

VXLAN decapsulation extracts the Layer 2 packet from the payload of the encapsulated packet, and removes the VXLAN header.

Each of the edge switches 104, 106, 108, and 110 can connect to various endpoint devices. In examples according to FIG. 1, the edge switch 104 is connected to the following endpoint devices: a server computer 164, a wireless access point (WAP) 174, and a storage system 184; the edge switch 106 is connected to a server computer 166, a wireless access point 176, and a storage system 186; the edge switch 108 is connected to a server computer 168, and the edge switch 110 is connected to a server computer 170. In the state shown in FIG. 1, wireless access points and storage systems have not yet been connected to the edge switches 108 and 110.

Although FIG. 1 shows examples of endpoint devices connected to each edge switch, in other examples, an edge switch can be connected to other types of endpoint devices.

In some examples, endpoint devices shown in FIG. 1 communicate over a VLAN 150. More generally, hosts can communicate over the VLAN 150. A host can include an endpoint device, an electronic component in the endpoint device, or a program executed in the endpoint device.

In some examples, the VLAN 150 is stretched or extended across different physical domains, such as different autonomous systems, different sites, and so forth. Autonomous systems and sites are discussed further below. In other examples, stretching of VLANs is not performed, in which case the endpoint devices connected to different edge switches would communicate over respective different VLANs.

In the example arrangement depicted in FIG. 1, the tunnels T1 to T4 connecting the edge switches 104, 106, 108, and 110 are "stitched" at the border switch 102. Thus, traffic sent over any of the tunnels T1 to T4 may be forwarded by the border switch 102 to other tunnels. The traffic forwarded may include broadcast packets (packets that are part of BUM traffic). Such broadcast packets forwarded by the border switch 102 over tunnels may overburden network resources if intelligent mechanisms according to some examples of the present disclosure are not provided to dynamically prevent forwarding of broadcast packets over certain tunnels.

For example, the flooding of broadcast packets over the tunnels T1 to T4 may hog communication bandwidth between hosts connected to different edge switches, which can increase delays or cause communication errors in communications between the hosts connected to different edge switches. The communication delays or errors can adversely impact the communication of traffic over a VLAN, such as the VLAN 150. As a further example, control plane convergence may be impacted in the control plane of the underlay and overlay network. Control plane convergence refers to a state at which forwarding and routing tables are populated to allow packets to be forwarded to hosts in the underlay and overlay network.

Flooding of broadcast packets in the underlay and overlay network can also result in reduced scalability. Adding more VTEPs to the underlay and overlay network can lead to multi-fold increases in broadcast traffic, and thus increases the likelihood that performance of the underlay and overlay network will suffer.

Having to manually (by a user such as an administrator) configure broadcast groups to address the broadcast traffic flooding issue in the underlay and overlay network is cumbersome and labor intensive. Also, such a manual configuration is static and does not allow for dynamic timely adjustments of broadcast groups to reduce broadcast traffic.

In accordance with some implementations of the present disclosure, the border switch 102 includes a broadcast broker 132 that is able to dynamically assign, based on one or more factors, tunnels of an overlay network to multiple broadcast groups. The factors include a factor relating to an operation in the underlay and overlay network, such as whether response packets are received in response to transmitted packets, and/or other factors as discussed further below. The dynamic assignment of tunnels to broadcast groups allows the assignment of a tunnel to be modified from a first broadcast group to a second broadcast group that is different from the first broadcast group.

The broadcast broker 132 can be implemented with one or more hardware processing circuits, or can be implemented with a combination of one or more hardware processing circuits and machine-readable instructions (software and/or firmware) executable on the one or more hardware processing circuits.

In alternative examples, the broadcast broker 132 may be implemented in a computing system that is separate from the border switch 102. Implementing the broadcast broker 132 in a separate computing system can allow operations of the broadcast broker 132 to be offloaded from the border switch 102 so that such operations do not overburden the border switch 102. In examples where the broadcast broker 132 is implemented in the separate computing system, the broadcast broker 132 can interact with the border switch 102 to support the dynamic assignment of tunnels to broadcast groups according to some implementations of the present disclosure.

In some examples, the broadcast groups include a deny broadcast group (DBG) and one or more assigned broadcast groups (ABGs). If a first tunnel is assigned to the DBG, then a broadcast packet received at the border switch 102 over a second tunnel (different from the first tunnel) would not be forwarded to the first tunnel based on the first tunnel being assigned to the DBG. Generally, if a given tunnel is assigned to a DBG, no broadcast packet will be forwarded over the given tunnel.

However, if a given tunnel is assigned to an ABG, a broadcast packet may be forwarded to the given tunnel if the broadcast packet contains a broadcast address associated with the ABG. In some examples, an ABG may be associated with a VLAN. Thus, different VLANs may be associated with corresponding different ABGs. More specifically, a first ABG may be associated with a first VLAN, a second ABG is associated with a second VLAN, and so forth. In some cases, multiple ABGs may be associated with a given VLAN, and/or an ABG may be associated with multiple VLANs. Although examples refer to ABGs associated with VLANs, it is noted that ABGs may be associated with other groupings of entities. A grouping of entities associated with an ABG is to receive a broadcast packet targeting the ABG.

A host may send broadcast packets through an edge switch. For example, a mobile device (not shown) associated with a wireless access point (e.g., 174 or 176) may transmit a broadcast packet when the mobile device moves from a coverage area of one wireless access point to the coverage area of another wireless access point. The host in this example is the mobile device. An example of such a broadcast packet is a gratuitous Address Resolution Protocol (ARP) message, which is an ARP Response transmitted by a device that was not prompted by an ARP Request. The gratuitous ARP message is broadcast by the mobile device to announce or update information associated with the mobile device, such as a mapping of network addresses. The gratuitous ARP message sent by the mobile device is forwarded by a wireless access point to an edge switch to which the wireless access point is connected. The VTEP in the edge switch encapsulates (e.g., VXLAN encapsulation) the gratuitous ARP message and sends the encapsulated gratuitous ARP message over a tunnel to the border switch 102.

As another example, a virtual machine (VM) that hosts a logical storage, such as a logical storage backed by the storage system 184 or 186, may transmit an ARP Request or a Layer 2 broadcast message. The host in this example is the VM.

As another example, a program executing in a server computer, such as any of the server computers 164, 166, 168, and 170, may transmit a broadcast packet. The host in this example is the program.

If a mobile device associated with the wireless access point 174 sends a gratuitous ARP message through the edge switch 104 over the tunnel T1 to the border switch 102, the border switch 102 may forward the gratuitous ARP message received over the tunnel T1 over each of the tunnels T2, T3, and T4 (if the tunnels T1 to T4 are all part of the same broadcast group). This forwarding of the gratuitous ARP message may be performed regardless of whether there are hosts coupled to the edge switches 106, 108, and 110 that would make use of the gratuitous ARP message. For example, in the configuration of the network arrangement shown in FIG. 1, no wireless access point is connected to the edge switches 108 and 110. As a result, forwarding the broadcast packet received from the wireless access point 174 to the edge switches 108 and 110 over respective tunnels T3 and T4 would result in the gratuitous ARP message simply being discarded at the edge switches 108 and 110, since no wireless access points are connected to the edge switches 108 and 110. Thus, forwarding the gratuitous ARP message over the tunnels T3 and T4 is wasteful of network resources.

Similarly, no storage systems are connected to the edge switches 108 and 110. A broadcast packet from a VM associated with the storage system 184 may be sent by the edge switch 104 over the tunnel T1 to the border switch 102. If the border switch 102 forwards this broadcast packet over the tunnels T3 and T4 to the edge switches 108 and 110, the edge switches 108 and 110 will discard the broadcast packet since the edge switches 108 and 110 are not connected to storage systems and would not make use of the broadcast packet from the VM associated with the storage system 184.

As another example, a program may perform a specific workflow in the server computer 164. In the workflow, the program may transmit a broadcast packet. The workflow may involve server computers 164 and 166, but the workflow does not involve server computers 168 and 170. Therefore, forwarding the broadcast packet sent by the program in the server computer 164 over the tunnels T3 and T4 to the edge switches 108 and 110 is wasteful of network resources.

If there are a large quantity of tunnels connected to the border switch 102, the forwarding of broadcast packets over all tunnels connected to the border switch 102 regardless of whether or not edge switches are to make use of the broadcast packet would flood the underlay and overlay network and may overburden network resources of the underlay and overlay network. In accordance with some examples of the present disclosure, to prevent or reduce the likelihood of flooding the underlay and overlay network with broadcast packets, the broadcast broker 132 can assign selected tunnels to the DBG to prevent broadcast packets from being forwarded to the selected tunnels, such as tunnels T3 and T4 in the examples above.

The broadcast broker 132 can dynamically change the assignment of any tunnel from the DBG to an ABG to allow forwarding of broadcast packets over the tunnel. Examples of how the dynamic assignment of tunnels to broadcast groups including the DBG and one or more ABGs are discussed further below, such as in connection with FIG. 2 and FIG. 3. In some examples, the broadcast broker 132 stores tunnel broadcast group assignment information 136 in a memory 138 of the border switch 102.

The memory 138 can be implemented using one or more memory devices, including any or some combination of the following: a dynamic random access memory (DRAM) device, a static random access memory (SRAM) device, a flash memory device, or any other type of memory device.

The tunnel broadcast group assignment information 136 maps tunnels to broadcast groups, such as the DBG and one or more ABGs noted above. The tunnel broadcast group assignment information 136 may be in the form of a table with entries, where an entry of the table correlates a tunnel to a corresponding broadcast group. In other examples, the tunnel broadcast group assignment information 136 can be in a different data structure.

In examples according to FIG. 1, the edge switches 104 and 106 are part of an autonomous system AS1, and the edge switches 108 and 110 are part of an autonomous system AS2. An autonomous system (AS) is based on a collection of IP routing prefixes, where a routing prefix (also referred to as a network prefix) identifies a network portion of an IP address. The first part of the IP address is a network address that identifies a network (the "network portion"), and the second part of the IP address is a host address that identifies a host (e.g., a machine, an electronic component, or a program).

An autonomous system can be assigned an autonomous system number (ASN). An autonomous system may be controlled by a single entity, such as an Internet service provider (ISP) or another type of control entity. In some cases, a single entity can control multiple autonomous systems.

None of the edge switches in the autonomous system AS1 are connected by tunnels to any of the edge switches in the autonomous system AS2. On the other hand, the edge switch 104 in the autonomous system AS1 is connected by the tunnel T5 to the edge switch 106 in the autonomous system AS1. Similarly, the edge switch 108 in the autonomous system AS2 is connected by the tunnel T6 to the edge switch 110 in the autonomous system AS2.

To communicate between an edge switch in the autonomous system AS1 and an edge switch in the autonomous system AS2, a packet traverses from the edge switch in the autonomous system AS1 to the border switch 102, which then sends the packet to the edge switch in the autonomous system AS2. In examples where there are multiple border switches, the packet from an edge switch in one autonomous system sent to an edge switch in another autonomous system can traverse multiple border switches.

An autonomous system can also be referred to as a fabric. A "fabric" can refer to a set of fully-meshed VTEPs for a VXLAN data plane. In the example of FIG. 1, the set of fully-meshed VTEPs in the autonomous system AS1 (a first fabric) includes the VTEPs 124 and 126 connected over the tunnel T5. The set of fully-meshed VTEPs in the autonomous system AS2 (a second fabric) includes the VTEPs 128 and 130 connected over the tunnel T6.

In some examples, the autonomous system AS1 can be part of a first site, and the autonomous system AS2 can be part of a second site that is different from the first site. The first and second sites may be geographically dispersed from one another. In other examples, the autonomous systems AS1 and AS2 are part of the same site. A "site" can refer to a geographically separate location (i.e., separate from another geographical location). For example, different sites may be located in different countries, different states or provinces, different cities, different parts of a city, different buildings or campuses, or other physical location. A site can include one or more autonomous systems.

In some examples, the border switch 102 can implement BGP routing, where the BGP refers to a protocol that supports routing among different autonomous systems. BGP can be used for routing within an autonomous system, which is referred to as interior BGP (IBGP). Alternatively, BGP can be used for routing between different autonomous systems, which is referred to as exterior BGP (eBGP).

In some examples, a VTEP in an edge switch may operate according to an asymmetric model (also referred to as an asymmetric integrated routing and bridging (IRB) model). In other examples, a VTEP in an edge switch may operate according to a symmetric model (also referred to as a symmetric IRB model).

With the asymmetric model, a VTEP in an edge switch performs IRB on tunnel ingress; in other words, for a first packet received at the VTEP that is to be communicated over a tunnel to another switch, such as the border switch 102 of FIG. 1, the VTEP performs both routing (based on Layer 3 network addresses) and switching (based on a Layer 2 network address) of the first packet to the tunnel. However, for tunnel egress of a second packet (the second packet is received over a tunnel from another switch such as the border switch 102), the VTEP in the edge switch bridges the second packet to a destination, such as a destination VLAN (e.g., 150 in FIG. 1).

With the symmetric model, a VTEP performs both routing and bridging on ingress of packets to a tunnel and on egress of packets from a tunnel.

Techniques or mechanisms according to some implementations of the present disclosure are applicable to VTEPs that operate according to either the asymmetric model or the symmetric model.

Figure 2:
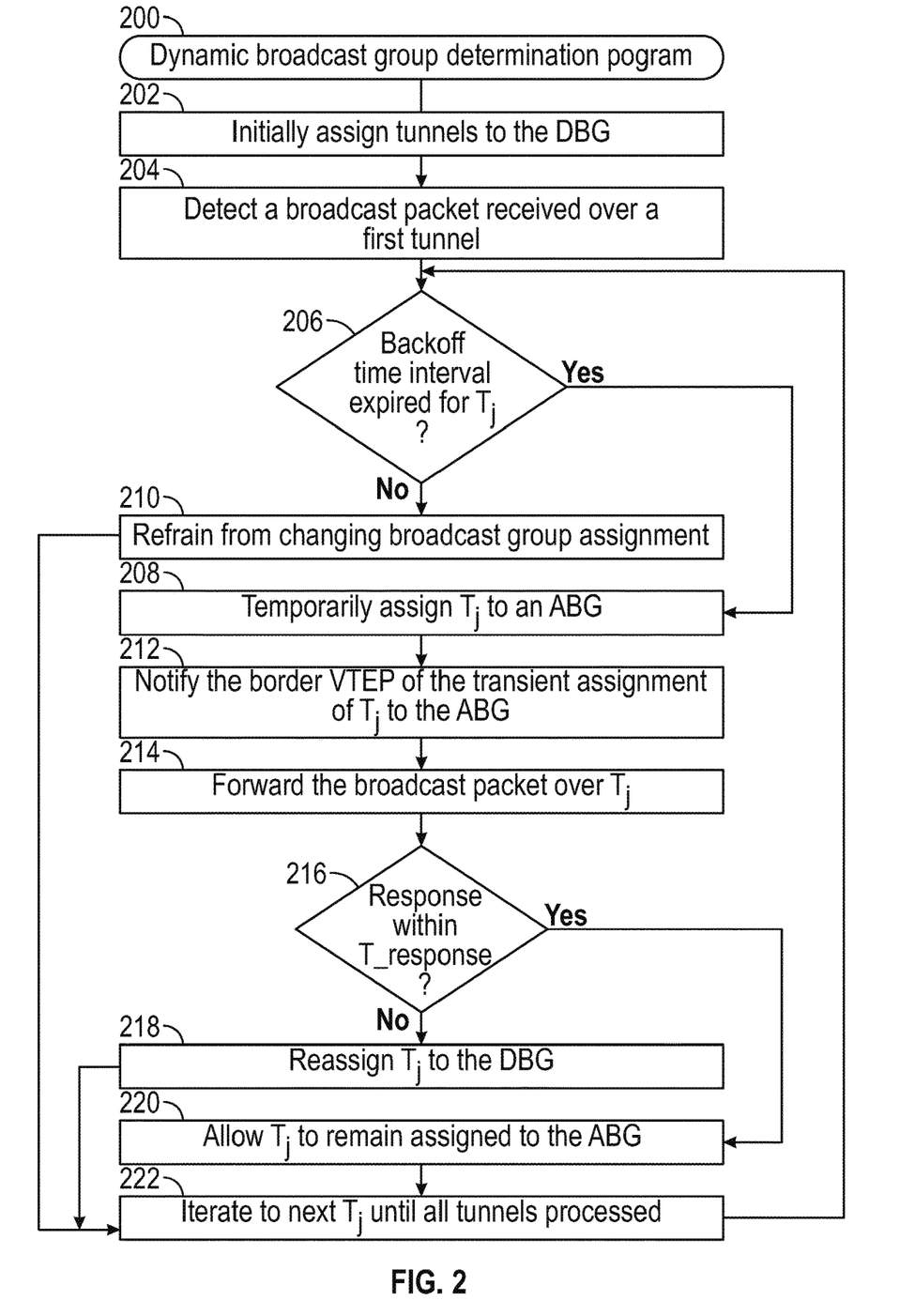
FIG. 2 is a flow diagram of a dynamic broadcast group determination process, according to some examples.

FIG. 2 is a flow diagram of a dynamic broadcast group determination process 200 performed by the broadcast broker 132 (FIG. 1) according to some examples. As noted above, the broadcast broker 132 may be part of the border switch 102 or part of a computing system separate from the border switch 102. FIG. 2 shows a sequence of tasks of the dynamic broadcast group determination process 200. In other examples, the dynamic broadcast group determination process 200 can include a different order of tasks, can omit some of the tasks shown in FIG. 2, and/or can add other tasks.

The broadcast broker 132 monitors traffic over tunnels (e.g., T1 to T4 in FIG. 1) connected to the border switch 102. The broadcast broker 132 initially assigns (at 202) at least some of the tunnels T1 to T4 to the DBG. In an example, it is assumed that the broadcast broker 132 has initially assigned tunnels T1 to T4 to the DBG.

For example, when a tunnel is created for a VNI between a VTEP in an edge switch and the border switch 102 based on establishment of a BGP-EVPN Inclusive Multicast Ethernet Tag (IMET) route, a tunnel that is identified by a combination of the VNI and an IP address of the VTEP in the edge switch can be initially assigned to the DBG.

In some examples, BGP EVPN uses IMET routing, also referred to as Route Type 3 (RT3), for the auto-discovery of remote peers (VTEPs) to set up tunnels over VXLAN for carrying BUM traffic. BUM traffic includes packets with an unknown destination (a unicast packet with an unknown destination) or that is to be sent to multiple destinations (e.g., a broadcast or multiple packet).

The assumption behind assigning a tunnel to the DBG is that either (1) there are no host(s) connected to an edge switch connected to the tunnel and thus the edge switch would simply drop any broadcast packet received by the edge switch, or (2) any host(s) connected to an edge switch connected to the tunnel is (are) not involved in a workflow associated with the broadcast packet, so the broadcast packet is of no use or relevance to the host(s).

In some examples, the broadcast broker 132 can assign a tunnel connected to a given edge switch if a MAC or MAC/IP route over the tunnel to the given edge switch is learnt. A MAC or MAC/IP route refers to a network path to a host (e.g., an endpoint device or a program in an endpoint device) that can be a source or destination of packets. A MAC route is a Layer 2 network path, and learning the MAC route refers to populating Layer 2 forwarding tables in switches with MAC addresses so that a Layer network path can be determined for forwarding packets to the host. A MAC/IP route refers to a network path to the host that includes a Layer 2 network path and a Layer 3 network path. The Layer 3 network path can be determined based on populating Layer 3 routing tables in switches with IP addresses. If a MAC or MAC/IP route over the tunnel is learnt, then the tunnel is assigned to an ABG associated with a VLAN mapped to the VNI of the tunnel. In examples according to FIG. 2, once a tunnel is assigned to an ABG based on learning of a MAC or MAC/IP route over the tunnel, the dynamic broadcast group determination process 200 does not change the assignment of the tunnel to the ABG in response to receipt of a broadcast packet.

The broadcast broker 132 detects (at 204) that a broadcast packet is received over a first tunnel (e.g., any of tunnels T1 to T4) connected to the border switch 104. In an example, it is assumed that the first tunnel is the tunnel T1. The detection of a broadcast packet may be based on an interface counter of a network interface of the border VTEP 122. A "network interface" is a communication interface that communicates signals over a network. The interface counter for tracking broadcast packets may advance a count of the interface counter in response to receipt of a broadcast packet. If the interface counter has a count greater than 1 or another threshold (where the threshold is based on a configuration of a trap at the border VTEP 122), that indicates to the broadcast broker 132 that a broadcast packet has been received that may have to be forwarded to one or more tunnels. In other examples, a detection of receipt of a broadcast packet may be detected in a different way.

The broadcast packet is to be transmitted to a host that is part of a VLAN (e.g., 150 in FIG. 1) that is mapped to a given VNI (e.g., VNIx). In the example of FIG. 1, the tunnels T1 to T4 are identified by respective combinations of VNIx and IP addresses of respective VTEPs 124, 126, 128, and 130. More specifically, the tunnel T1 is identified by (VTEP 124 IP address, VNIx), the tunnel T2 is identified by (VTEP 126 IP address, VNIx), the tunnel T3 is identified by (VTEP 128 IP address, VNIx), and the tunnel T4 is identified by (VTEP 130 IP address, VNIx).

In response to the detection (at 204) of the broadcast packet received over the tunnel T1, the broadcast broker 132 determines (at 206), for a tunnel Tj (j=2, 3, or 4), whether a backoff time interval for the tunnel Tj has expired. The backoff time interval refers to a time interval during which the broadcast broker 132 does not change an assignment of the tunnel Tj, such as from the DBG to an ABG.

If the broadcast broker 132 determines (at 206) that the backoff time interval for the tunnel Tj has not expired, the broadcast broker 132 refrains (at 210) from changing the broadcast group assignment of the tunnel Tj (in other words, the broadcast broker 132 takes no action with respect to broadcast group assignment for the tunnel Tj). Even though there is a broadcast packet to forward, the backoff time interval prevents the forwarding of the broadcast packet over the tunnel Tj if the backoff time interval has not expired.

On the other hand, if the broadcast broker 132 determines (at 206) that the backoff time interval for the tunnel Tj has expired, the broadcast broker 132 temporarily assigns (at 208) the tunnel Tj to an ABG (e.g., the ABG associated with the VLAN to which the broadcast traffic is destined). Broadcast traffic can include one or more broadcast packets.

The broadcast broker 132 notifies (at 212) the border VTEP 122 of the transient assignment of the tunnel Tj to the ABG. The notification can be accomplished by updating the tunnel broadcast group assignment information 136 (FIG. 1) for example, to map the tunnel Tj to the ABG (instead of the DBG).

Based on this notification, the border VTEP 122 forwards (at 214) the broadcast packet over the tunnel Tj. The broadcast broker 132 determines (at 216) whether a response to the broadcast packet is received over the tunnel Tj. If no response to the broadcast packet is received over the tunnel Tj within a specified amount of time (e.g., T_response, which represents the maximum amount of time for a destination to respond to the broadcast packet), the broadcast broker 132 re-assigns (at 218) the tunnel Tj back to the DBG. This re-assignment can be accomplished by updating the tunnel broadcast group assignment information 136 to map the tunnel Tj to the DBG.

However, if a response to the broadcast packet is received over the tunnel Tj within the specified amount of time (e.g., T_response), the broadcast broker 132 allows (at 220) the tunnel Tj to remain assigned to the ABG.

The dynamic broadcast group determination process 200 iterates (at 222) to the next tunnel Tj until all tunnels have been processed. Tasks 206 to 220 are iteratively performed for each of the tunnels T2, T3, and T4 in an example where the broadcast packet is received over the tunnel T1.

The broadcast broker 132 can configure the backoff time interval for the tunnel Tj based on a quantity of times (n) that no response was received after broadcast packets were sent over the tunnel Tj. For example, the backoff time interval can be set based on $2n$; the more times (n) that there was no response to broadcast packets were received over the tunnel Tj, the longer the backoff time interval. The broadcast broker 132 sets the backoff time interval that exponentially increases with the quantity of times (n) that no response was received after broadcast packets were sent over the tunnel Tj. The increase of the backoff time interval for the tunnel Tj is to avoid or reduce the likelihood of frequent transitions between assignments to the DBG and an ABG. Keeping tunnels assigned to the DBG for longer time periods when no responses to broadcast packets are detected over the tunnels can reduce the amount of broadcast traffic sent over the tunnels.

Figure 3:
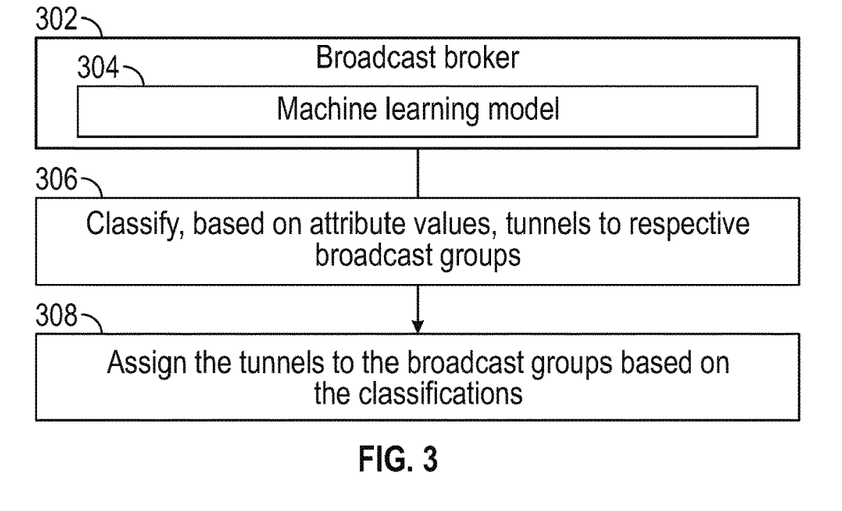
FIG. 3 is a flow diagram a dynamic broadcast group determination process performed by a broadcast broker based on classifications of a machine learning model, according to further examples.

The dynamic broadcast group determination process 200 of FIG. 2 is reactive in nature in that whether an assignment of a tunnel is to be kept to an ABG is in response to whether or not a response to a broadcast packet is received. In further examples, FIG. 3 shows a dynamic broadcast group determination process performed by a broadcast broker 302 that uses a machine learning model 304. The broadcast broker 302 may be implemented in the border switch 102 of FIG. 1, or in a computing system separate from the border switch 102. The broadcast broker 302 can pre-assign a tunnel to an ABG based on use of analytics (classifications) performed by the machine learning model 304.

In some examples, the machine learning model 304 includes a support vector machine (SVM). In other examples, the machine learning model 304 can include a logistic regression model (also referred to as a "logit model") or another different type of machine learning model. An SVM includes a supervised learning model that is able to analyze data (in the form of vectors) to classify the data into multiple categories. In some examples according to the present disclosure, the categories can include the DBG and one or more ABGs. Training data, e.g., training vectors, can be provided to perform training (supervised learning) of the SVM. The training vectors can include labels that assign each training vector to a respective category (the DBG and the one or more ABGs).

Given values of attributes (also referred to as features) relating to a tunnel Tj, the machine learning model 304 is able to assign a category (a broadcast group such as the DBG or an ABG) to the tunnel Tj. Stated differently, the machine learning model 304 classifies (at 306), based on the values of the attributes, tunnels to respective broadcast groups (e.g., the DBG and one or more ABGs). For example, the machine learning model 304 can produce a classification output of a first value (e.g., "0") or a second value (e.g., "1"). If the classification output produced by the machine learning model 304 is "1," then the tunnel Tj should be moved to (or stays in) an ABG. If the classification output produced by the machine learning model 304 is "1," then the tunnel Tj should be moved to (or stays in) the DBG.

The attributes (features) considered by the machine learning model 304 can include one or some combination of the following: (1) presence of a response to a broadcast packet from an edge switch not associated with a host learning, (2) events such as time-based events or events associated with host learnings, (3) traffic qualification, and (4) a type of VTEP.

The machine learning model 304 may consider a combination of different attributes (features) to determine whether a tunnel is to be classified as DBG or ABG. The broadcast broker 302 assigns (at 308) the tunnels to the broadcast groups based on the classifications by the machine learning model 304. If the machine learning model 304 classifies a tunnel as DBG, the broadcast broker 302 assigns the tunnel to the DBG. However, if machine learning model 304 classifies a tunnel as ABG, the broadcast broker 302 assigns the tunnel to an ABG.

A "host learning" refers to learning of a MAC or MAC/IP route to a host, as discussed further above in connection with FIG. 2. An edge switch not associated with a host learning is an edge switch for which a MAC or MAC/IP route has not been learned (also referred to as "published"). Attribute (1) indicates whether any responses to broadcast packets were received from an edge switch not associated with a host learning. If attribute (1) indicates that no responses to broadcast packets were received from an edge switch over a given tunnel, then the machine learning model 304 would tend to favor classifying the given tunnel as DBG, i.e., the given tunnel would more likely be assigned to the DBG by the broadcast broker 302.

Attribute (2) can include a time-based event attribute. For example, the machine learning model 304 can learn based on training data that no traffic or little traffic is exchanged over a specific tunnel during certain times of day or on weekends or holidays. During those times of day or on dates during which no traffic or little traffic is exchanged over a given tunnel, the machine learning model 304 would tend to favor classifying the given tunnel as DBG. However, during times of day during which a lot of traffic is exchanged over the given tunnel, the machine learning model 304 would tend to favor classifying the given tunnel as ABG; i.e., the given tunnel would more likely be assigned to an ABG. For example, during the times of day during which a lot of traffic is exchanged over the given tunnel, the broadcast broker 302 can pre-assign the given tunnel to the ABG associated with the VNI of the given tunnel.

Attribute (2) can alternatively or additionally include a host unavailable event attribute, such as an attribute indicating that an event has occurred that renders a host unavailable. For example, an endpoint device may be being upgraded or is being maintained. During the upgrade time interval or the maintenance time interval, the endpoint device may be shut down or may otherwise be unavailable. Thus, during such a host unavailable event, the machine learning model 304 would tend to favor classifying the given tunnel as DBG.

Attribute (2) can alternatively or additionally include an expected usage attribute relating to a planned or expected event that affects usage of services over the underlay and overlay network. The planned or expected event may include a planned power shutdown or otherwise widespread occurrence that can affect usage of services.

Attribute (2) can alternatively or additionally include a host learning attribute that indicates whether a host learning has occurred with respect to a given tunnel connected to an edge switch. Lack of a host learning would tend to favor classifying the given tunnel as DBG. On the other hand, if a host learning has occurred with respect to the given tunnel, the machine learning model 304 would tend to favor classifying the given tunnel as ABG; i.e., the given tunnel would more likely be assigned to an ABG by the broadcast broker 302.

Attribute (3) relates to traffic qualification of traffic communicated over a tunnel. Traffic qualification can identify types of traffic, such as ARP traffic, multicast traffic, or other types of traffic. An example of multicast traffic is a multicast join message sent by a host to join a multicast group. A communication of a multicast join message over a given tunnel is indicative that more traffic is expected to be communicated over the given tunnel. In such a case, the machine learning model 304 would tend to favor classifying the given tunnel as ABG; i.e., the given tunnel would more likely be assigned to an ABG by the broadcast broker 302. Presence of other types of traffic may not be indicative that future traffic would likely occur over the given tunnel; as a result, in this latter case, the machine learning model 304 would tend to favor classifying the given tunnel as DBG.

Figure 4:
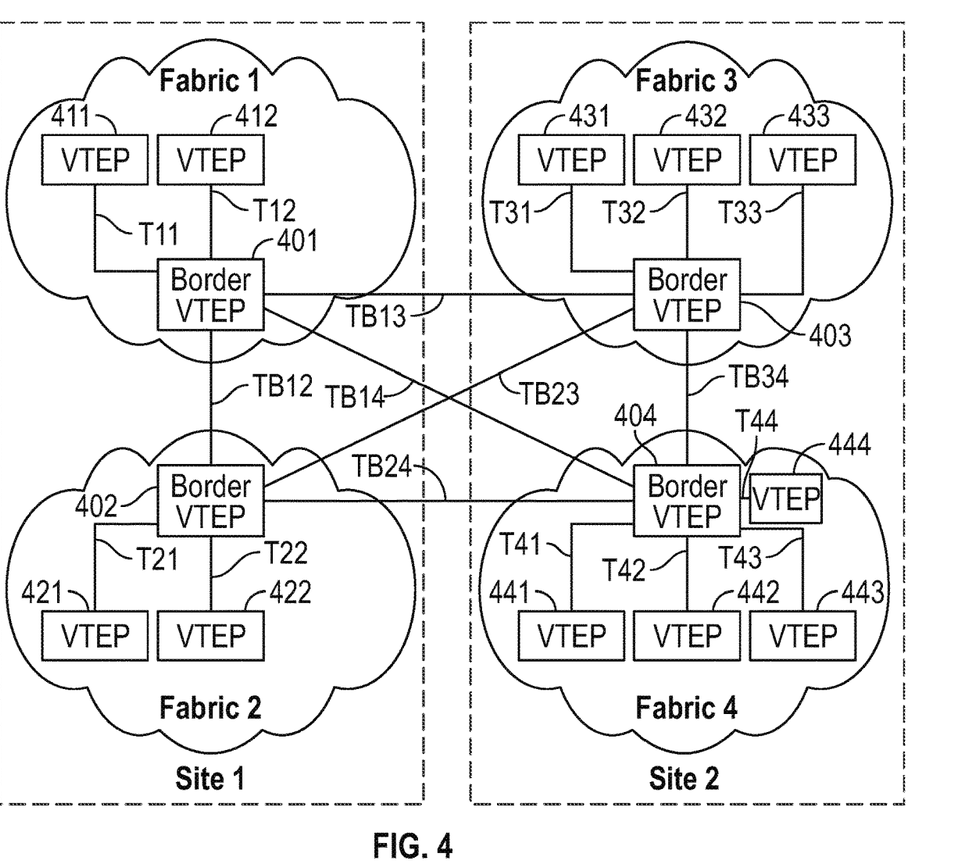
FIG. 4 is a block diagram of a network arrangement including Virtual Extensible Local Area Network (VXLAN) tunnel endpoints (VTEPs) in different fabrics and sites, according to some examples.

Attribute (4) is a type of VTEP attribute. FIG. 4 is a block diagram of an example network arrangement that includes two sites (site 1 and site 2) and four fabrics (fabric 1, fabric 2, fabric 3, and fabric 4). A fabric can also be referred to as an autonomous system.

Fabric 1 includes edge VTEPs 411 and 412 that are connected by intra-fabric tunnels T11 and T12, respectively, to a border VTEP 401 that is part of fabric 1. Fabric 2 includes edge VTEPs 421 and 422 that are connected by intra-fabric tunnels T21 and T22, respectively, to a border VTEP 402 that is part of fabric 2. Fabric 3 includes edge VTEPs 431, 432, and 433 that are connected by intra-fabric tunnels T31, T32, and T33, respectively, to a border VTEP 403 that is part of fabric 3. Fabric 4 includes edge VTEPs 441, 442, 443, and 444 that are connected by intra-fabric tunnels T41, T42, T43, and T44, respectively, to a border VTEP 404 that is part of fabric 4.

An "edge VTEP" is a VTEP in an edge switch (or more generally, in an edge network device). A "border VTEP" is a VTEP in a border switch (or more generally, in a border network device). An "intra-fabric" tunnel is a tunnel within a fabric. An "inter-fabric" tunnel is a tunnel that connects different fabrics.

The border VTEPs 401 and 402 are interconnected by an inter-fabric tunnel TB12, the border VTEPs 401 and 403 are interconnected by an inter-fabric tunnel TB13, the border VTEPs 401 and 404 are interconnected by an inter-fabric tunnel TB14, the border VTEPs 402 and 403 are interconnected by an inter-fabric tunnel TB23, the border VTEPs 402 and 404 are interconnected by an inter-fabric tunnel TB24, and the border VTEPs 403 and 404 are interconnected by an inter-fabric tunnel TB34.

In the example of FIG. 4, there are three types of VTEP. The edge VTEPs 411, 412, 421, 422, 431, 432, 433, 441, 442, 443, and 444 are examples of internal VTEPs, since they are internal within respective fabrics. The fabrics also include the border VTEPs 401, 402, 403, and 404, which are another example type of VTEP. In addition, a further type of VTEP is a remote fabric border VTEP. From the point of view of an entity in fabric 1, remote fabric border VTEPs include border VTEPs 402, 403, and 404 in respective fabrics 2, 3, and 4. Thus, a remote fabric border VTEP is a border VTEP in a remote fabric, from the perspective of an entity in a given fabric.

The following are example scenarios that may impact classifications performed by the machine learning model 304 of the broadcast broker 132 of FIG. 1.

In a first scenario, servers of a data center that provide services may be located in fabrics 2, 3, and 4. Endpoint devices that access the services may be located in fabric 1. To enable timely access of the services by the endpoint devices in fabric 1, the machine learning model 304 may classify the inter-fabric tunnels TB12, TB13, and TB14 from the border VTEP 401 of fabric 1 to the remote fabric border VTEPs 402, 403, and 404 as ABG, such that the broadcast broker would assign the inter-fabric tunnels TB12, TB13, and TB14 to one or more ABGs associated with VNIs corresponding to the inter-fabric tunnels TB12, TB13, and TB14. More generally, in this first scenario, the assignment of a tunnel to an ABG is based on a determination that the tunnel is connected to a remote fabric border VTP.

In a second scenario, a few endpoint devices, such as Internet-of-things (IoT) devices, may be connected to ports of a border switch including a border VTEP (e.g., any of 401 to 404). Tunnels are established from the border VTEP to the IoT devices. IoT devices may include sensors or other devices that transmit data, but the IoT devices sporadically receive data. For example, the IoT devices may receive data when the IoT devices are being configured, upgraded, or maintained. At other times, the IoT devices would not receive data. In such examples, the machine learning model 304 would classify the tunnels to the IoT devices connected to the border switch as DBG unless the machine learning model 304 is provided with event data (e.g., attribute (2)) indicating that the IoT devices are being configured, upgraded, or maintained, such that data would have to be sent to the IoT devices.

In a third scenario, broadcast traffic may be communicated within a fabric; e.g., an endpoint device connected to the edge VTEP 411 sends broadcast traffic. However, there is no hosts connected to the edge VTEP 412 to receive the broadcast traffic. In this third scenario, the machine learning model 304 classifies the tunnel T12 to the edge VTEP 412 as DBG.

In some examples, broadcast brokers (e.g., 132 in FIG. 1 or 302 in FIG. 3) are able to perform automatic demarcation and alignment of split horizons based on cognitive clue gathering dynamically from the control plane of an underlay and overlay network. A "split horizon" refers to a way of controlling where broadcast traffic is sent. The automatic demarcation and alignment of split horizons is achieved by assigning tunnels to the DBG and one or more ABGs. Broadcast traffic is not forwarded to any tunnel assigned to the DBG. Broadcast traffic is forwarded to a tunnel assigned to a given ABG if the broadcast traffic is targeted to a broadcast address of the given ABG.

In some examples, the ability to perform dynamic assignment of tunnels to broadcast groups for controlling where broadcast traffic is forwarded can be selectively activated or deactivated. For example, a user or another entity can activate the dynamic assignment of tunnels to broadcast groups by sending a command to a broadcast broker to activate the broadcast broker, by configuring a configuration setting to activate the broadcast broker, or by using another activation technique. A user or another entity can also deactivate the dynamic assignment of tunnels by issuing a deactivation command, by configuring a setting, or by using another deactivation technique.

Figure 5:
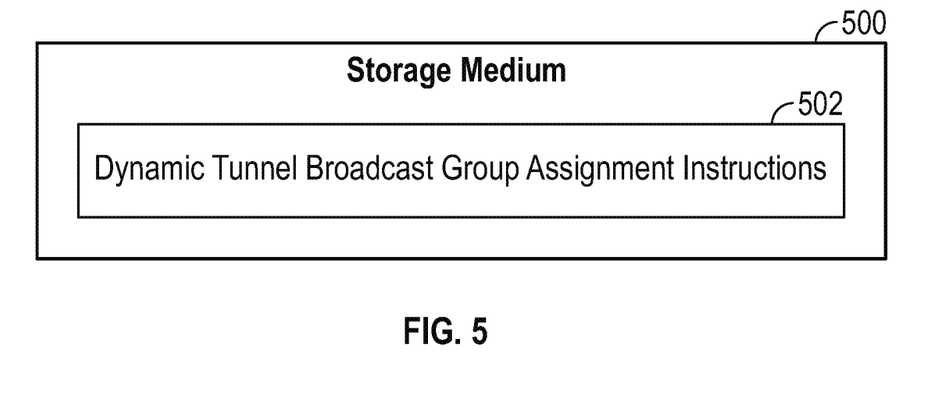
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system may be the border switch 102 of FIG. 1, or the system may be a computing system separate from a border switch.

The machine-readable instructions include dynamic tunnel broadcast group assignment instructions 502 to dynamically assign, based on one or more factors, tunnels of an underlay and overlay network to a plurality of broadcast groups, where the one or more factors include a factor relating to an operation in the underlay and overlay network. The dynamic assignment of the tunnels to the plurality of broadcast groups includes modifying an assignment of a first tunnel from a first broadcast group to a second broadcast group of the plurality of broadcast groups. The first broadcast group may be the DBG, and the second broadcast group may be an ABG. Alternatively, the first broadcast group may be an ABG, and the second broadcast group may be the DBG.

The factor relating to an operation in the underlay and overlay network includes a factor relating to whether a response is received for a broadcast packet, such as based on the determination 216 performed in FIG. 2, or attribute (1) considered by the machine learning model 304 of FIG. 3 discussed further above.

In further examples, the one or more factors include one or more of attributes (1) to (4) considered by the machine learning model 304 of FIG. 3. For example, a time factor can affect an assignment of a tunnel to a broadcast group based on a current time. As another example, a host unavailable factor indicates that an event has occurred that renders a host unavailable, which can affect an assignment of a tunnel to a broadcast group. For example, a host may be unavailable due to an upgrade or a maintenance of a host.

As a further example, a traffic type factor (e.g., attribute (3) considered by the machine learning model 304) relating to a type of traffic in the underlay and overlay network can affect an assignment of a tunnel to a broadcast group. As yet another example, a VTEP type factor indicating a type of a VTEP connected to a tunnel can affect an assignment of the tunnel to a broadcast group.

In some examples, the first broadcast group is a broadcast group to which tunnels are assigned to block any transmission of broadcast packets by a border network device (e.g., the border switch 102) to the tunnels assigned to the first broadcast group.

In some examples, a VLAN (e.g., 150 in FIG. 1) is part of the second broadcast group, and the VLAN is extended to include hosts connected to a plurality of edge network devices.

In some examples, the modification of the assignment of the first tunnel from the first broadcast group to the second broadcast group is a transient assignment subject to further modification.

In some examples, the machine-readable instructions set a backoff time interval for the first tunnel responsive to not receiving the response to the broadcast packet. During the backoff time interval, the machine-readable instructions refrain from transitioning the first tunnel from the first broadcast group to the second broadcast group in response to receiving broadcast packets.

In some examples, the dynamic assignment of the tunnels to the plurality of broadcast groups is performed based on an output of a machine learning model.

Figure 6:
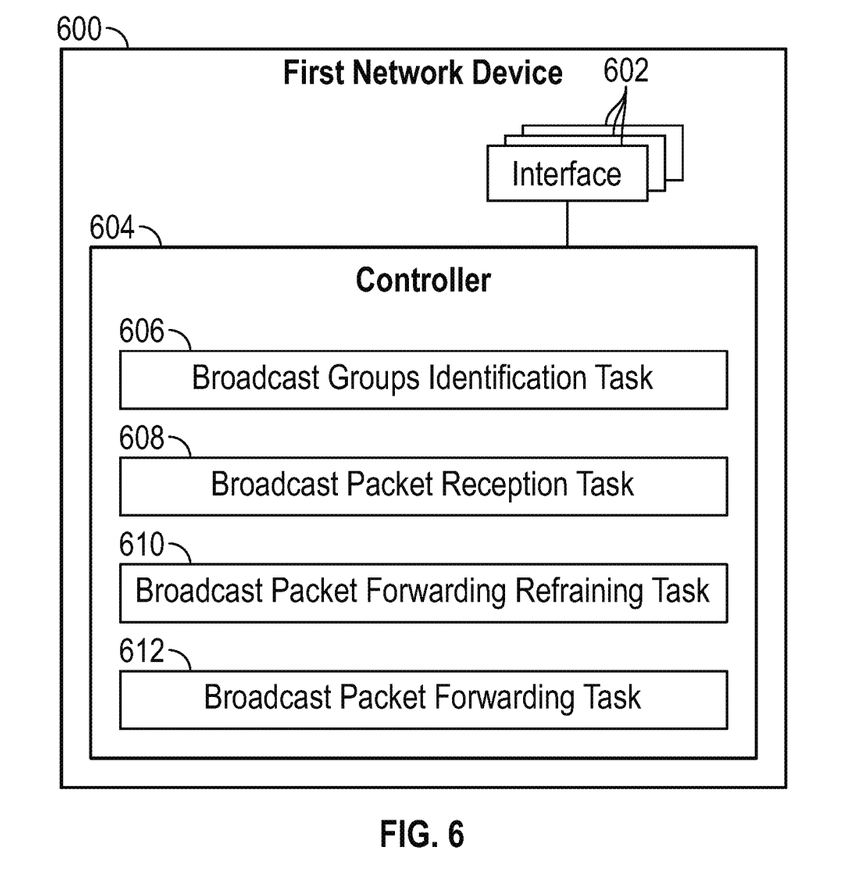
FIG. 6 is a block diagram of a network device according to some examples.

FIG. 6 is a block diagram of a first network device 600. For example, the first network device 600 may be any of the edge switches 104 to 110 of FIG. 1. The first network device 600 includes interfaces 602 to communicate over tunnels of an underlay and overlay network to a plurality of edge network devices. An interface can include communication circuitry (such as a transceiver) to send and receive signals. The interface may also include protocol layer(s) to manage communication of data according to respective protocol(s) over a network.

The first network device 600 includes a controller 604 to perform various tasks. The controller 604 may include the broadcast broker 132 of FIG. 1 or the broadcast broker 302 of FIG. 3. The tasks of the controller 604 include a broadcast groups identification task 606 to identify broadcast groups to which the tunnels are dynamically assigned. The broadcast groups include a first broadcast group (e.g., the DBG) and a second broadcast group (e.g., an ABG).

The tasks of the controller 604 include a broadcast packet reception task 608 to receive a broadcast packet. The broadcast packet may be part of BUM traffic, for example.

The tasks of the controller 604 include a broadcast packet forwarding refraining task 610 to, based on identifying a first tunnel as being assigned to the first broadcast group, refrain from forwarding the broadcast packet over the first tunnel.

The tasks of the controller 604 include a broadcast packet forwarding task 612 to, based on identifying a second tunnel as being assigned to the second broadcast group, forward the broadcast packet over the second tunnel responsive to the broadcast packet being targeted to the second broadcast group.

Figure 7:
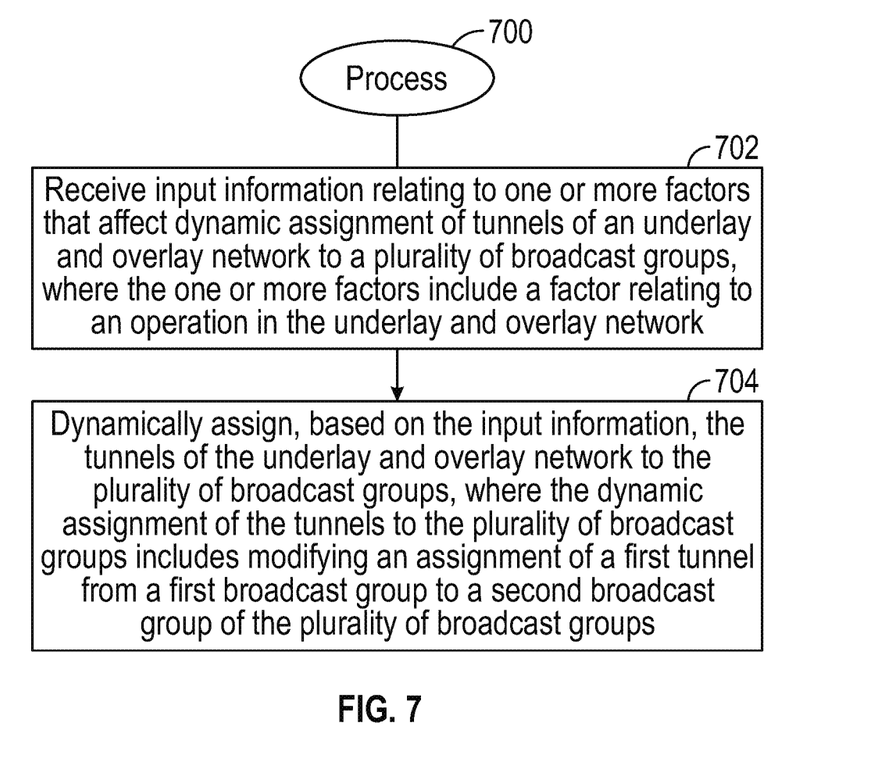
FIG. 7 is a flow diagram of a process according to some examples.

FIG. 7 is a flow diagram of a process 700 according to some examples. The process 700 may be performed by the broadcast broker 132 or 302, for example. The process 700 includes receiving (at 702) input information relating to one or more factors that affect dynamic assignment of tunnels of an underlay and overlay network to a plurality of broadcast groups, where the one or more factors include a factor relating to an operation in the underlay and overlay network.

The process 700 includes dynamically assigning (at 704), based on the input information, the tunnels of the underlay and overlay network to the plurality of broadcast groups, where the dynamic assignment of the tunnels to the plurality of broadcast groups includes modifying an assignment of a first tunnel from a first broadcast group to a second broadcast group of the plurality of broadcast groups.

The first broadcast group may be the DBG or an ABG, or vice versa. In some examples, a first tunnel is assigned to the second broadcast group based on a classification performed by a machine learning model (e.g., 304 in FIG. 3 above) based on the input information.

A storage medium (e.g., 600 in FIG. 6) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

dynamically assign, based on one or more factors, tunnels of an underlay and overlay network to a plurality of broadcast groups, wherein the one or more factors comprise a factor relating to an operation in the underlay and overlay network, and wherein the dynamic assignment of the tunnels to the plurality of broadcast groups comprises:

modifying an assignment of a first tunnel from a first broadcast group to a second broadcast group of the plurality of broadcast groups.

2. The non-transitory machine-readable storage medium of claim 1, wherein a border network device is to refrain from transmitting a broadcast packet to any tunnel assigned to the first broadcast group.

3. The non-transitory machine-readable storage medium of claim 2, wherein the first broadcast group is a broadcast group to which tunnels are assigned to block any transmission of broadcast packets to the tunnels assigned to the first broadcast group.

4. The non-transitory machine-readable storage medium of claim 2, wherein the border network device is to transmit a given broadcast packet to a tunnel assigned the second broadcast group if the given broadcast packet is targeted to the second broadcast group.

5. The non-transitory machine-readable storage medium of claim 4, wherein a virtual local area network (VLAN) is part of the second broadcast group, and the VLAN is extended to include hosts connected to a plurality of edge network devices.

6. The non-transitory machine-readable storage medium of claim 2, wherein the dynamic assignment of the tunnels to the plurality of broadcast groups comprises:

determining whether a response to a broadcast packet is received by the border network device over the first tunnel, and modifying an assignment of the first tunnel from the second broadcast group to the first broadcast group based on the border network device not receiving the response to the broadcast packet.

7. The non-transitory machine-readable storage medium of claim 6, wherein the modification of the assignment of the first tunnel from the first broadcast group to the second broadcast group is a transient assignment subject to further modification.

8. The non-transitory machine-readable storage medium of claim 6, wherein the instructions upon execution cause the system to:

set a backoff time interval for the first tunnel responsive to not receiving the response to the broadcast packet; and during the backoff time interval, refrain from transitioning the first tunnel from the first broadcast group to the second broadcast group in response to receiving broadcast packets.

9. The non-transitory machine-readable storage medium of claim 2, wherein the system is part of the border network device, and wherein the dynamic assignment of the tunnels to the plurality of broadcast groups comprises:

initially assigning the first tunnel to the first broadcast group, based on receiving a broadcast packet, modifying an assignment of the first tunnel from the first broadcast group to the second broadcast group, transmitting the broadcast packet over the first tunnel that is assigned to the second broadcast group, determining whether a response to the broadcast packet is received by the border network device over the first tunnel, and based on a determination that the response to the broadcast packet is received by the border network device over the first tunnel, maintain the assignment of the first tunnel to the second broadcast group.

10. The non-transitory machine-readable storage medium of claim 1, wherein the dynamic assignment of the tunnels to the plurality of broadcast groups is performed based on an output of a machine learning model.

11. The non-transitory machine-readable storage medium of claim 10, wherein the factor relating to the operation in the underlay and overlay network comprises a factor relating to whether a response is received for a broadcast packet.

12. The non-transitory machine-readable storage medium of claim 10, wherein the one or more factors comprise a time factor that causes a change in assignment of the tunnels to the plurality of broadcast groups based on a current time.

13. The non-transitory machine-readable storage medium of claim 10, wherein the one or more factors comprise a host unavailable factor indicating that an event has occurred that renders a host unavailable.

14. The non-transitory machine-readable storage medium of claim 10, wherein the one or more factors comprise an event factor relating to a planned or expected event that affects usage of services over the underlay and overlay network.

15. The non-transitory machine-readable storage medium of claim 10, wherein the one or more factors comprise a factor relating to a type of traffic in the underlay and overlay network.

16. The non-transitory machine-readable storage medium of claim 10, wherein the one or more factors comprise a type of a Virtual Extensible Local Area Network (VXLAN) tunnel endpoint (VTEP) connected to a tunnel.

17. A first network device comprising:

interfaces to communicate over tunnels of an underlay and overlay network to a plurality of edge network devices; and a controller to:

identify broadcast groups to which the tunnels are dynamically assigned, wherein the broadcast groups comprise a first broadcast group and a second broadcast group, receive a first broadcast packet at a first time, based on identifying a first tunnel as being assigned to the first broadcast group at the first time, refrain from forwarding the first broadcast packet over the first tunnel, receive a second broadcast packet at a second time, and based on identifying the first tunnel as being assigned to the second broadcast group at the second time, forward the second broadcast packet over the first tunnel responsive to the second broadcast packet being targeted to the second broadcast group.

18. The first network device of claim 17, wherein the first broadcast group is a broadcast group to which tunnels are assigned to block any transmission of broadcast packets to the tunnels assigned to the first broadcast group.

19. A method comprising:

receiving, at a system comprising a hardware processor, input information relating to one or more factors that affect dynamic assignment of tunnels of an underlay and overlay network to a plurality of broadcast groups, wherein the one or more factors comprise a factor relating to an operation in the underlay and overlay network; and dynamically assigning, by the system based on the input information, the tunnels of the underlay and overlay network to the plurality of broadcast groups, wherein the dynamic assignment of the tunnels to the plurality of broadcast groups comprises modifying an assignment of a first tunnel from a first broadcast group to a second broadcast group of the plurality of broadcast groups.

20. The method of claim 19, wherein the dynamic assignment of the tunnels to the broadcast groups comprises:

assigning the first tunnel to the second broadcast group based on a classification performed by a machine learning model based on the input information.

* * * * *